United States Patent [19]

Kijima

[11] Patent Number: 5,675,491

[45] Date of Patent: Oct. 7, 1997

[54] SELF-EXCITING PUSH-PULL INVERTER HAVING REDUCED DIELECTRIC STRENGTH REQUIREMENTS

[75] Inventor: Seiichi Kijima, Tokyo, Japan

[73] Assignee: Kijima Co., Ltd., Tokyo, Japan

[21] Appl. No.: 189,451

[22] Filed: Jan. 31, 1994

[30] Foreign Application Priority Data

Feb. 13, 1993 [JP] Japan ................... 5-047504
Mar. 22, 1993 [JP] Japan ................... 5-085148

[51] Int. Cl.$^6$ ........................... H02M 7/538
[52] U.S. Cl. ............... 363/133; 363/22; 363/49; 323/223
[58] Field of Search ............... 315/223; 331/114; 363/22, 23, 49, 133

[56] References Cited

U.S. PATENT DOCUMENTS

| | | | |
|---|---|---|---|
| 2,896,146 | 7/1959 | Jenkins | 363/22 |
| 3,192,464 | 6/1965 | Johnson et al. | 363/23 |
| 3,241,088 | 3/1966 | Guyton | 363/22 |
| 3,242,414 | 3/1966 | Zelina | 363/22 |
| 3,586,957 | 6/1971 | Cass | 363/22 |
| 3,652,919 | 3/1972 | Harrigan | 363/22 |
| 3,663,944 | 5/1972 | Low et al. | 363/133 |
| 3,743,916 | 7/1973 | Weischedel et al. | 363/23 |
| 3,996,506 | 12/1976 | Kichak | 363/22 |
| 4,103,356 | 7/1978 | Finlay | 363/22 |
| 4,296,461 | 10/1981 | Mallory et al. | 363/22 |
| 4,734,828 | 3/1988 | Vargo | 363/22 |
| 5,159,540 | 10/1992 | Lee | 363/22 |
| 5,309,350 | 5/1994 | Kijima | 363/133 |

*Primary Examiner*—Jeffrey L. Sterrett
*Attorney, Agent, or Firm*—Loeb & Loeb LLP

[57] ABSTRACT

This invention relates to a push-pull inverter used, for example, as a driver for cold-cathode discharge tube, hot-cathode discharge tube, etc. and comprises a boosting transformer including an input coil, an output coil and a feedback coil, and first and second switching elements for input coil current of this transformer, wherein the output of the boosting transformer is divided into a pair of output coil sections connected in series with each other and a conductor section lying between these output coil sections is circuit-arranged so that this conductor section be at the negative potential of the DC source.

5 Claims, 9 Drawing Sheets

SELF-EXCITING PUSH-PULL INVERTER HAVING REDUCED DIELECTRIC STRENGTH REQUIREMENTS

BACKGROUND OF THE INVENTION

1. Technical Field

The present invention relates to a push-pull inverter used as a driver for a cold-cathode discharge tube, a hot-cathode discharge tube, etc.

2. Background Art

FIG. 11 illustrates a conventional embodiment of the push-pull inverter constructed as the driver for a fluorescent lamp 11.

This inverter is provided with a push-pull inverter substantially comprising a boosting transformer 12 and switching transistors 13, 14.

Upon application of a starting signal of low level from a terminal, a transistor 16 serving as a source switch is turned on and applied with DC power from a DC source connected to terminals 17, 18.

Then, the transistors 13, 14 are supplied through starting resistors 19, 20, respectively, with their base current. Though both the transistors 13, 14 are consequently switched to their conductive states, they are different from each other in transistor characteristic and circuit arrangement so that one of them becomes more positively conductive than the other and said one transistor is turned on earlier than the other.

For example, when the transistor 13 is turned on earlier than the transistor 14, the current supplied from the DC source passes through a choke coil 21 into a primary coil 12P of the transformer 12 and this primary coil 12P generates thereacross the voltage of a direction as indicated by a solid line arrow in FIG. 11.

Since, at this time point, a tertiary coil 12F generates thereacross the voltage of a direction as indicated by a solid line arrow in FIG. 11, the base of the transistor 13 is affected by a positive feedback effect and the collector current of this transistor 13 rapidly increases. Thereupon, a secondary coil 12S generates thereacross the inductive voltage of a direction as indicated by a solid line arrow in FIG. 11, which initiates lighting of the fluorescent lamp 11.

Since increase in the current flowing through the transistor 13 is suppressed at a saturation point which depends upon a base current as well as an amplification degree, the voltage of a direction as indicated by a broken line arrow in FIG. 11 is generated across the primary coil 12P of the transformer 12 and the transistor 13 is switched from ON to OFF while the transistor 14 is switched from OFF to ON, as said increase in the current is reduced.

When the transistor 14 is turned on, the voltage of a direction as indicated by a broken line arrow in FIG. 11 is generated across the tertiary coil 12F and consequently the base of the transistor 14 is affected by the positive feedback and the current flowing through the transistor 14 increases, resulting in that the inductive voltage of a direction as indicated by a broken line arrow in FIG. 11 is generated across the secondary coil 12S, which maintains lighting of the fluorescent lamp 11.

Thereafter alternate turning-on of the transistors 13, 14 repeatedly occurs in the same manner as has been mentioned above, generating a high AC voltage across the secondary coil 12S.

Said boosting transformer 12 is provided in the form of a miniaturized transformer comprising the primary coil 12P, the secondary coil 12S and the tertiary coil 12F lap-wounded wound around a winding drum of a bobbin, a ferrite core partially inserted into said winding drum and terminal pins planted on the bobbin to which the respective coil ends are fixed by means of soldering or the like.

The inverter of such type is often used as a back light power supply for a display provided in a word processor, personal computer or the like and, accordingly, the boosting transformer for such inverter is necessarily required to be as thin as possible.

Recently, considerably thinner boosting transformers have been developed and proposed. However, thinning as well as miniaturizing of the boosting transformer is limited by a problem such that a high output voltage of several thousand volts (e.g., 2000 to 3000 volts) required for such boosting transformer 12 inevitably makes a dielectric treatment difficult.

More specifically, in the boosting transformer 12 of the above-mentioned construction, the low voltage side of the secondary coil 12S (output coil) is at zero volts and the high voltage side is at several thousand volts, so said dielectric treatment among the primary coil 12P, the tertiary coil 12F, the terminal pins and the ground becomes more and more difficult as the configuration of the transformer is thinned.

SUMMARY OF THE INVENTION

In view of the state of the art as has previously been described, it is an object of the invention to develop a push-pull inverter allowing a boosting transformer to have a dielectric strength as low as possible and thereby facilitating a configuration of the transformer to be thinned and miniaturized.

The object set forth above is achieved, in accordance with the invention, by a push-pull inverter having a boosting transformer including an input coil to supply DC current via a center tap, an output coil to apply a load with electric power and a feedback coil, and first and second switching elements having their control electrodes connected to said feedback coil so as to be alternately turned on and off depending upon the direction of voltage generated across said feedback coil, wherein the electric current flowing through an input coil section on one side with respect to said center tap is switched on and off while the electric current flowing through an input coil section on the other side with respect to said center tap is switched off and on so that an alternating voltage is output from said output coil, said push-pull inverter being characterized by that the output coil of the boosting transformer is divided into two output coil sections; a conductor section lying between these two output coil sections is so circuit-arranged that said conductor section is at a negative potential of a DC source; and the load is connected between respective ends of said two output coil sections.

In said inverter, the sum of inductive voltages generated across the respective output coil sections is used as the total output voltage.

The inductive voltage generated across each output coil section forms an AC voltage alternately rising and dropping with respect to a ground potential (zero volts) and being sufficiently lower than the total output voltage.

Consequently, the dielectric treatment may be made not against a high voltage of the output coil but against the voltage generated across each output coil section which is sufficiently lower than the voltage against which the dielectric treatment has conventionally been required. This is significantly advantageous for thinning and miniaturizing of the boosting transformer.

BRIEF DESCRIPTION OF THE DRAWINGS

The invention will be described by way of example in reference with the accompanying drawings, in which.

DESCRIPTION OF THE PREFERRED EMBODIMENTS

Figure 1:
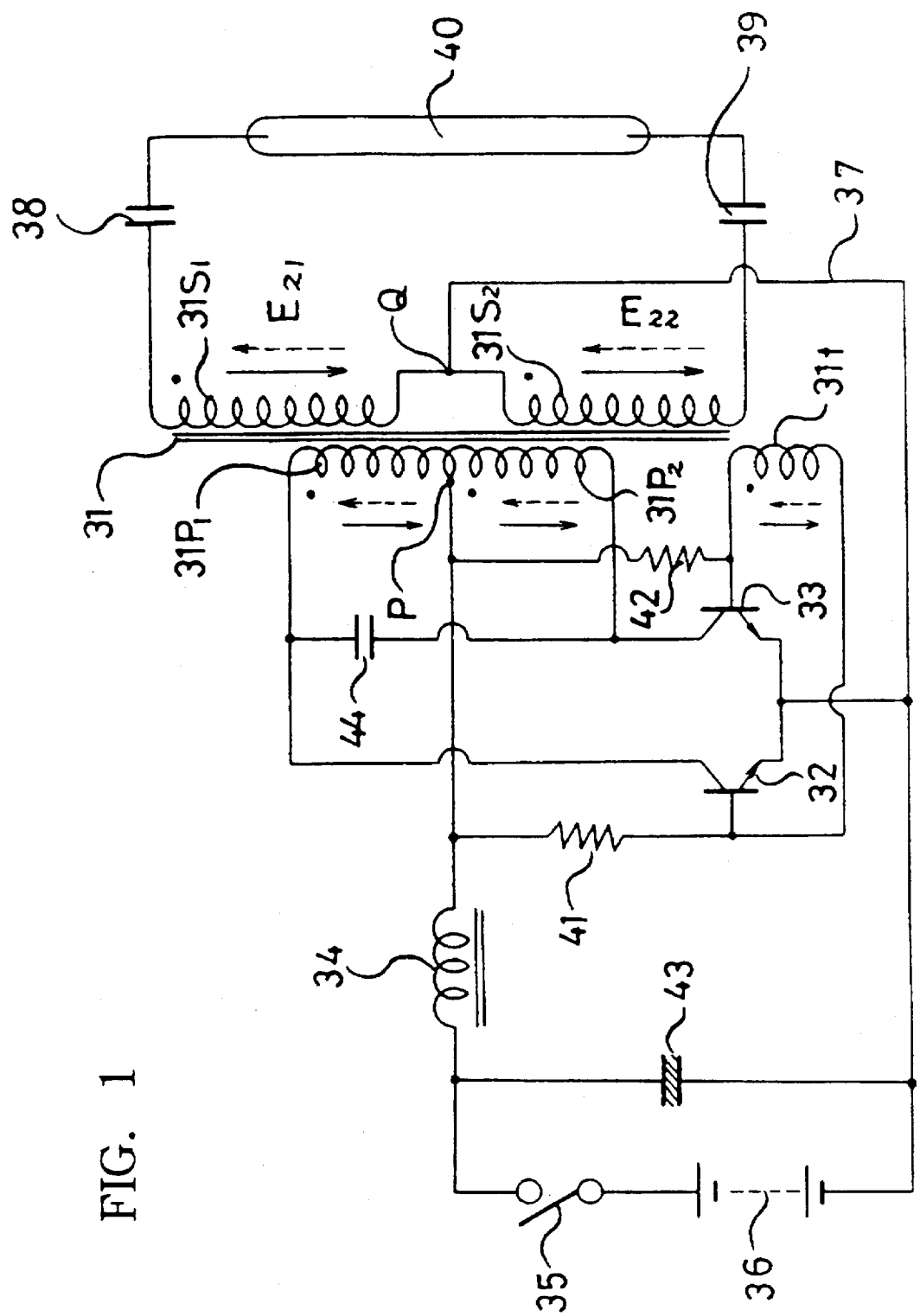
FIG. 1 is a circuit diagram showing an embodiment of the inverter as a push-pull inverter used as a driver for a fluorescent lamp.

Referring to FIG. 1, a push-pull inverter of the invention constructed particularly as a driver for a fluorescent lamp substantially comprises a boosting transformer 31, and switching transistors 32, 33.

As shown, the boosting transformer 31 includes an input coil (primary coil) having a coil section $31P_1$ on one side with respect to a center tap P and a coil section $31P_2$ on the other side, an output coil (secondary coil) having two coil sections $31S_1$, $31S_2$ connected in series with each other, and a feedback coil (tertiary coil) $31f$.

The center tap P of the input coil is connected through a choke coil 34 and a source switch 35 to a positive pole side of a source battery 36 and the boosting transformer is supplied from this center tap P with DC current.

One end of the input coil section $31P_1$ is connected to the collector of the transistor 32 and one end of the input coil section $31P_2$ is connected to the collector of the transistor 33 so that these input coil sections $31P_1$, $31P_2$ are connected to a negative pole side of the source battery 36 as the transistors 32, 33 are alternately turned on.

Opposite ends of the feedback coil $31f$ are connected to the bases of the transistors 32, 33 so that a feedback voltage is applied alternately to the respective bases of the transistors 32, 33 depending upon a direction of voltage generated across the feedback coil $31f$.

A conductor section Q lying between the output coil sections $31S_1$, $31S_2$ is connected via a line 37 to the negative pole side of the source battery 36.

An effect is thereby obtained as if the conductor section Q has been grounded via the line 37.

The output coil section $31S_1$ is connected through a capacitor 38 for load current limiting (i.e., ballast capacitor) to one electrode of the fluorescent lamp 40 while the output coil section $31S_2$ is connected through a capacitor 39 for load current limiting to the other electrode of the fluorescent lamp 40.

Consequently, a total output voltage corresponding to the sum of inductive voltages generated across the output coil sections $31S_1$, $31S_2$, respectively, is applied to the fluorescent lamp 40.

Resistors 41, 42 are connected to the bases of the transistors 32, 33, respectively, and serve as starting resistances and a capacitor 43 is for stabilization of the source voltage.

A capacitor 44 is connected in parallel with the input coil so as to form together therewith a resonance circuit. It should be understood that this capacitor advantageously functions to obtain the output voltage having a sinusoidal waveform but is not essential for the invention.

With the inverter according to this embodiment, upon closure of the source switch 35, electric current provided from the source battery 36 is applied through the starting resistors 41, 42 to the respective bases of the transistors 32, 33.

As a result, any one of the transistors is turned on depending upon the transistor characteristic and the circuit arrangement.

When the transistor 32 is turned on first, the source current is input through the center tap P so as to flow through the input coil section $31P_1$ and the collector-emitter of the transistor 32, so voltage of a direction as indicated by a solid line arrow is generated across the input coil section $31P_1$. Namely, the voltage level of the center tap P rises substantially up to the source voltage.

Voltage of a direction as indicated by a solid line arrow is generated due to electromagnetic induction across the input coil section $31P_2$ as primary coil current flows through the input coil section $31P_1$. Namely, the voltage level on the collector side of the transistor 33 rises substantially up to twice the source voltage.

At this time point, voltage of a direction as indicated by a solid line arrow is generated also across the feedback coil $31f$ and the transistor 32 is supplied with this feedback voltage and becomes positively conductive, rapidly increasing current flowing through the input coil section $31P_1$.

The operation as mentioned heretofore generates inductive voltages $E_{21}$, $E_{22}$ of respective directions as indicated by solid line arrows across the respective output coil sections $31S_1$, $31S_2$ and the sum of these voltages ($E_{21}+E_{22}$) is applied through the capacitors 38, 39, respectively, to the fluorescent lamp 40.

Thereupon, lighting of the fluorescent lamp 40 is initated.

When the transistor 32 is saturated, an increase in the current flowing through the input coil section $31P_1$ is reduced and voltage of a direction as indicated by a broken line arrow is generated across this input coil section $31P_1$, resulting in that the transistor 32 is turned off and the transistor 33 is turned on.

Now the voltage across the feedback coil $31f$ is reversed to a direction as indicated by a broken line arrow and the transistor 33 becomes significantly conductive, rapidly increasing the source current flowing through the input coil section $31P_2$.

Simultaneously, inductive voltages $E_{21}$, $E_{22}$ of directions as indicated by broken line arrows are generated across the output coil sections $31S_1$, $31S_2$, respectively, and $E_{21}+E_{22}$ is applied as a total output voltage to the fluorescent lamp 40, thus maintaining lighting of the fluorescent lamp 40.

In this manner, the transistors 32, 33 will be alternately turned on so as to apply AC voltage generated across both the output coil sections $31S_1$, $31S_2$ and thereby to maintain lighting of the fluorescent lamp 40.

It will be readily understood that, upon opening of the source switch 35, the alternate turning on-off (i.e., oscillation) is stopped and the output voltage from the boosting transformer 31 disappears, putting the light of the fluorescent lamp 40 out.

Operation of the inverter according to the specific embodiment that has been mentioned above will be discussed further in detail with respect to a relationship between the output of the boosting transformer 31 and the load.

Figure 2:
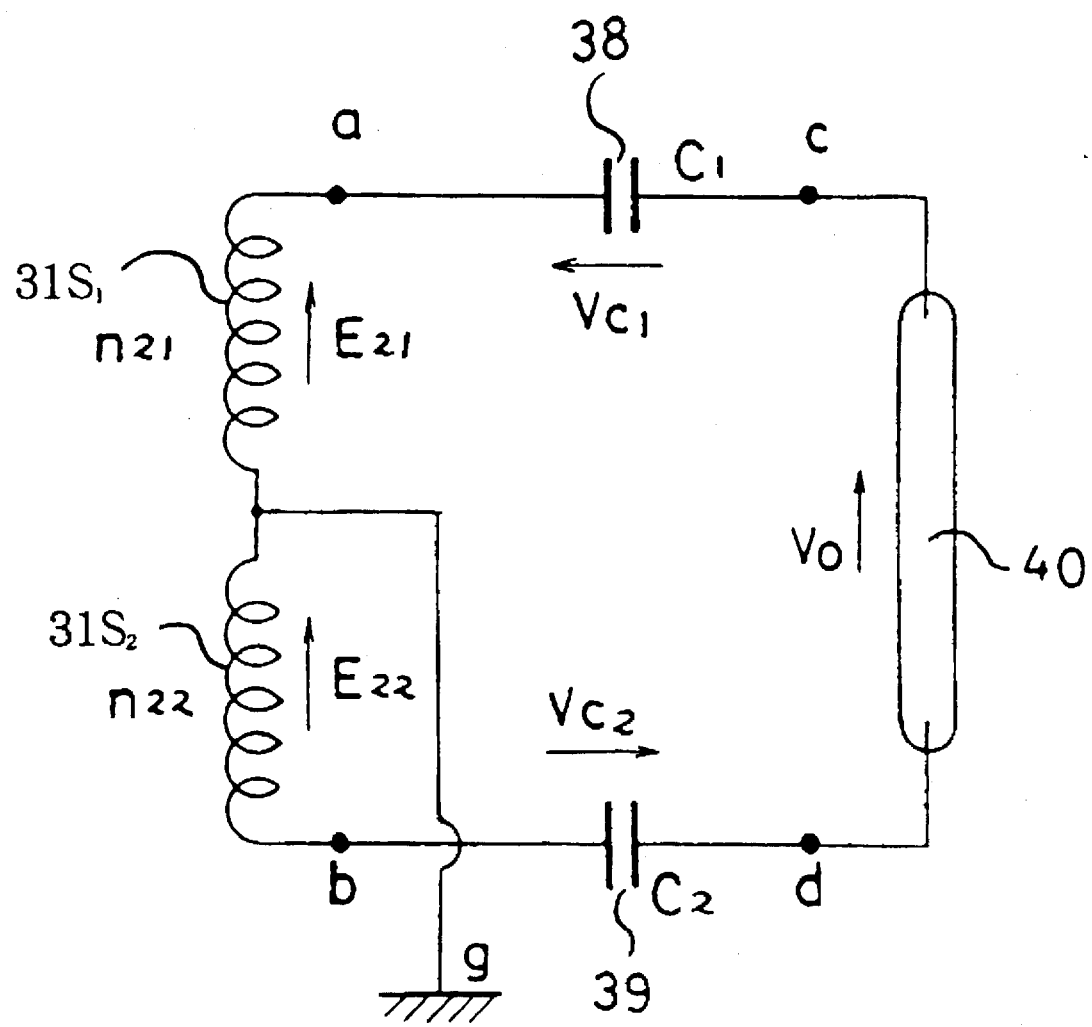
FIG. 2 is a simplified circuit diagram illustrating a manner in which said inverter operates.

FIG. 2 is a simplified circuit diagram illustrating the operation of the instant embodiment, in which the capacitors 38, 39 connected to the output coil sections $31S_1$, $31S_2$, respectively, of the boosting transformer 31 are shown together with the fluorescent lamp 40.

As will be apparent from FIG. 2, $E_{21}$=Vag, $E_{22}$ =Vgb,

Vo=Vcd,

Vdb=$Vc_1$=$VC_2$=Vac,

Vo=Vcg×2, $\theta$=$Sin^{-1}$(Vo/$2E_{21}$).

Figure 3:
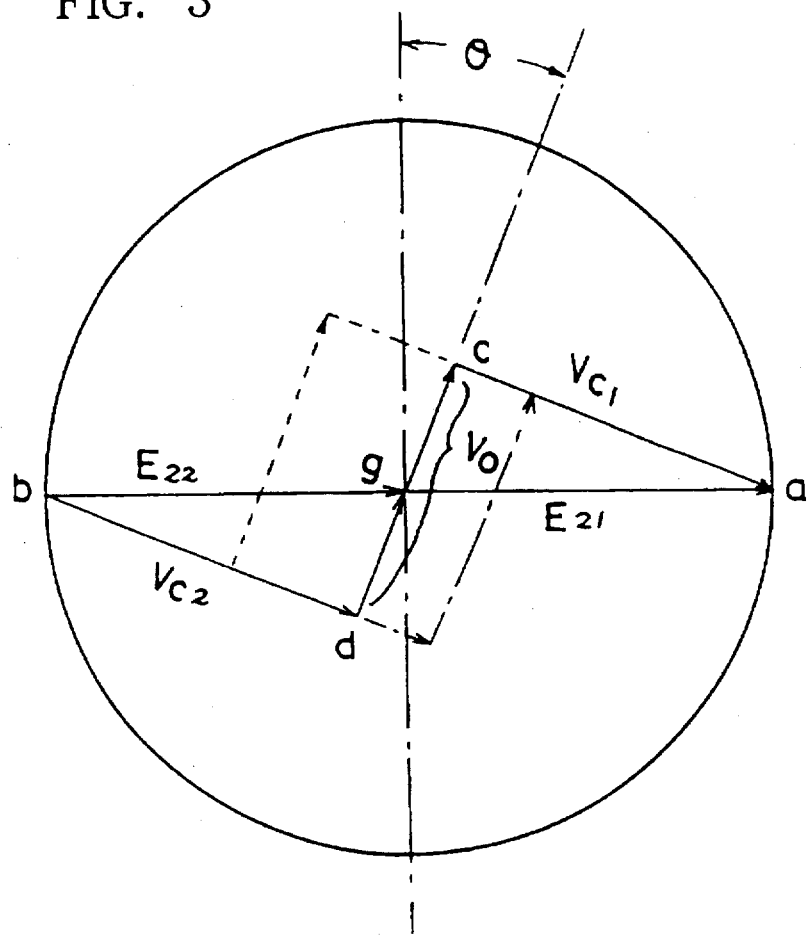
FIG. 3 is a vector diagram illustrating a manner in which said inverter operates.

FIG. 3 is a vector diagram illustrating this relationship.

Now a specific case will be considered, in which the output coil sections $31S_1$, $31S_2$ have the same number of turns $n_{21}$=$n_{22}$, i.e., $E_{21}$=$E_{22}$.

It is assumed here that a relationship of ($C_1$×$C_2$)/($C_1$+$C_2$) =constant is established between respective capacities $C_1$, $C_2$ of the capacitors 38, 39 and $\theta$=constant.

If $C_1$=$C_2$, the voltage Vo represented by a solid line (c–d) in FIG. 3 will be applied to the fluorescent lamp 40.

If $C_1$<$C_2$, the voltage Vo will shift leftward to a position indicated by a broken line in FIG. 3.

If $C_1$>$C_2$, the voltage Vo will shift rightward to a position as indicated by a two-dot-chain line in FIG. 3.

Accordingly, under the condition of $C_1$=$C_2$, the fluorescent lamp 40 will have the voltage VO/2 relative to the ground potential g.

If $C_1$<$C_2$ or $C_1$>$C_2$, on the other hand, the fluorescent lamp 40 will have a voltage higher than Vo/2 relative to the ground potential g.

Now another case will be considered, in which the output coil sections $31S_1$, $31S_2$ have respective numbers of turns $n_{21}$≠$n_{22}$, i.e., $E_{21}$≠$E_{22}$ but $\theta$=constant.

In this case, $E_{21}$=Vag, $E_{22}$=Vgb,

Vo=Vcg +Vgd=Vcd, $Vc_1$=Vac, $Vc_2$=Vdb, $\theta$=$Sin^{-1}$(Vo/$E_{21}$+$E_{22}$)).

Figure 4:
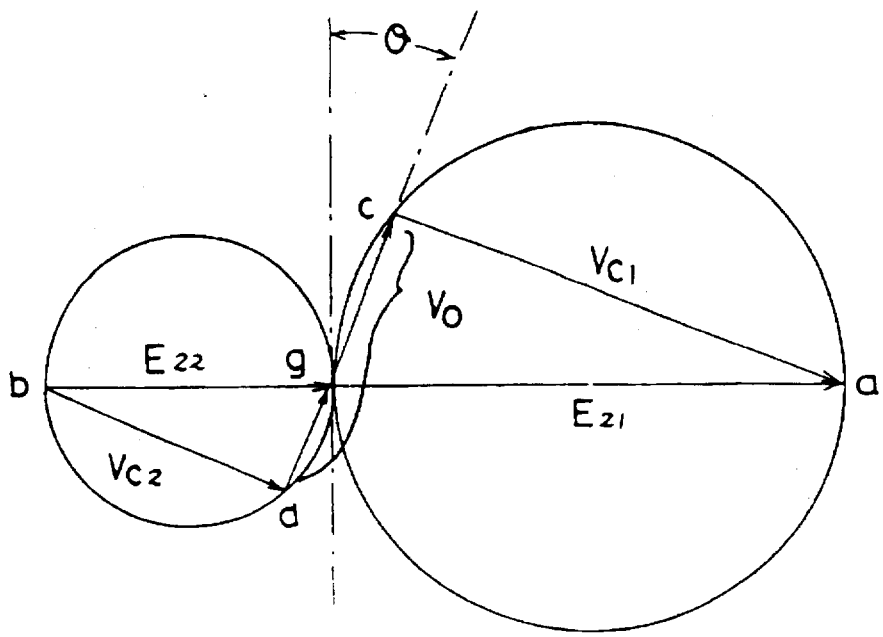
FIG. 4 is another vector diagram illustrating a manner in which said inverter operates.

FIG. 4 is a vector diagram illustrating this relationship.

FIG. 4 shows a case in which $C_1$=$C_2$ and the fluorescent lamp 40 has a voltage higher than VO/2 relative to the ground potential g.

If $C_1$<$C_2$ or $C_1$>$C_2$, Vo will shift left- and rightward, respectively, similarly to the case shown by FIG. 3, so the fluorescent lamp 40 will have a voltage higher than Vo/2 relative to the ground potential g.

Based on such observations, characteristics of the inverter according to this embodiment can be summarized as follows:

Use of the paired capacitors 38, 39 for load current limiting (i.e., ballast capacitors) is not disadvantageous compared to use of a single such capacitor of relatively high dielectric strength because each of said paired capacitors 38, 39 has a dielectric strength equal to ½ of the dielectric strength said single capacitor should have.

Use of the paired capacitors each having a relatively low dielectric strength advantageously results in reduction of cost compared to use of the single capacitor having a relatively high dielectric strength.

With the output coil sections $31S_1$, $31S_2$ having the same number of turns $n_{21}$=$n_{22}$, the line voltage between these output coil sections can be reduced to ½.

In addition, the dielectric strength among the input coil sections $31P_1$, $31P_2$, the feedback coil $31f$ and the ground g can be also reduced to ½.

A terminal voltage of the fluorescent lamp 40 relative to the ground potential g can be also reduced to Vo/2 by setting $C_1$=$C_2$.

Advantageous effects of the above-mentioned feature on the boosting transformer 31 will be discussed. The dielectric strength among the components such as the input coil sections $31P_1$, $31P_2$, the feedback coil $31f$ and the ground g can be reduced to ½ relative to the output coil sections $31S_1$, $31S_2$, so leakage current possibly flowing through a distributed capacitance of the coils can be reduced and copper loss of the transformer can be correspondingly alleviated. The sum of inductive voltages generated across the respective output coil sections $31S_1$, $31S_2$ is used as the output voltage and this feature also contributes to alleviation of the copper loss.

A level of voltage appearing in each core of the transformer is reduced by half as a result of dividing the output voltage into $E_{21}$ and $E_{22}$ and a creeping distance between a terminal pin and the core can be correspondingly shortened.

As will be readily appreciated from the foregoing description, the condition of $n_{21}$=$n_{22}$ and $C_1$=$C_2$ is extremely advantageous for thinning as well as miniaturizing of the transformer, since the voltages generated across the respective output coil sections $31S_1$, $31S_2$ can be reduced by half relative to the ground potential g, facilitating electrical insulation between the input coil and the output coil, and the creeping distance between the terminal pin and the core can be shortened.

With the output coil sections $31S_1$, $31S_2$ having their numbers of turns $n_{21}$≠$n_{22}$ and/or the capacitors 38, 39 having their capacities $C_1$≠$C_2$, the voltage applied to the fluorescent lamp 40 will become higher than VO/2 relative to the ground potential g. However, even such increased voltage is substantially lower than that in the conventional inverter.

Figure 5:
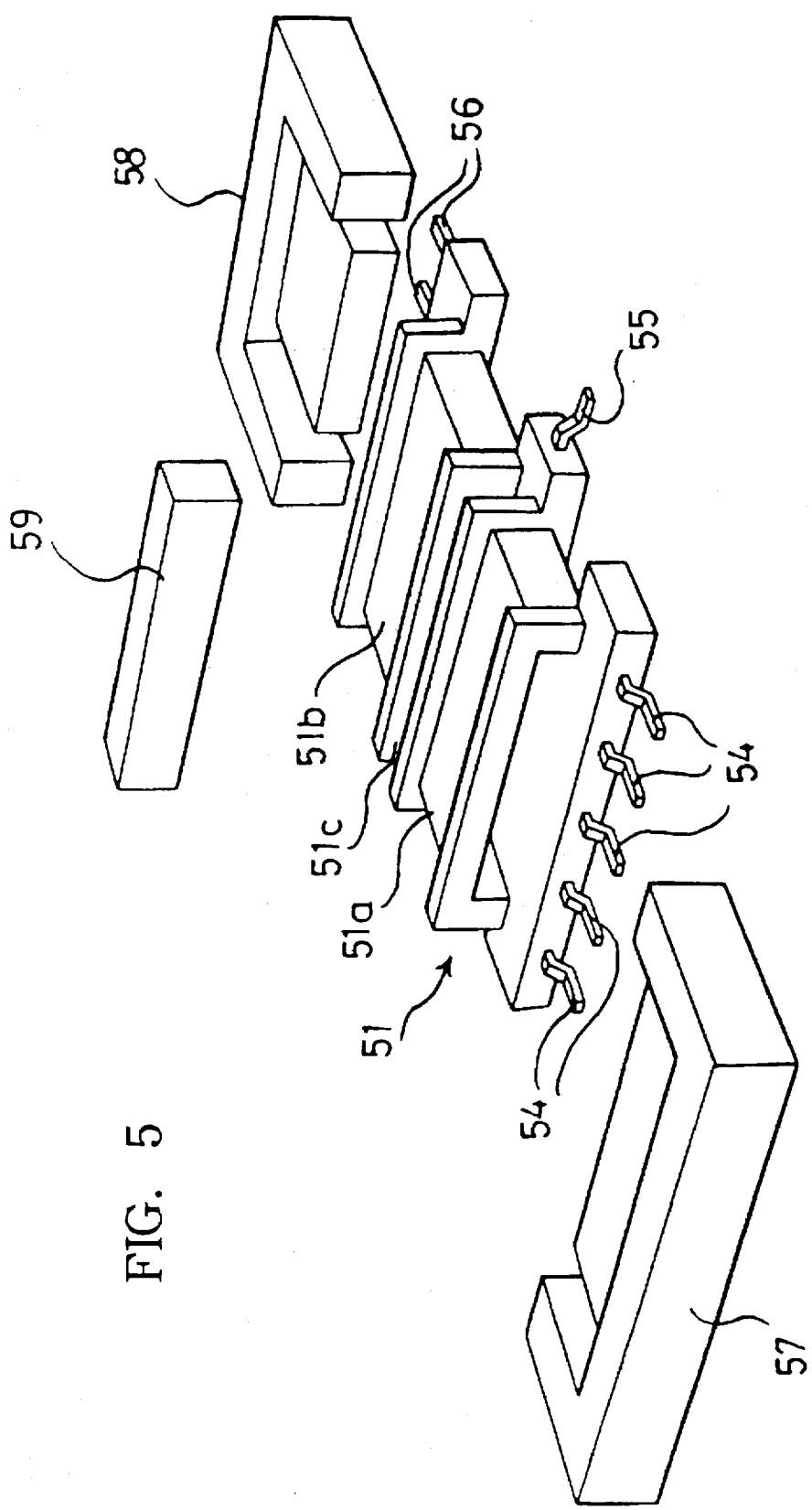
FIG. 5 is an exploded perspective view showing a bobbin and ferrite core of a boosting transformer as a component of said inverter.
Figure 6:
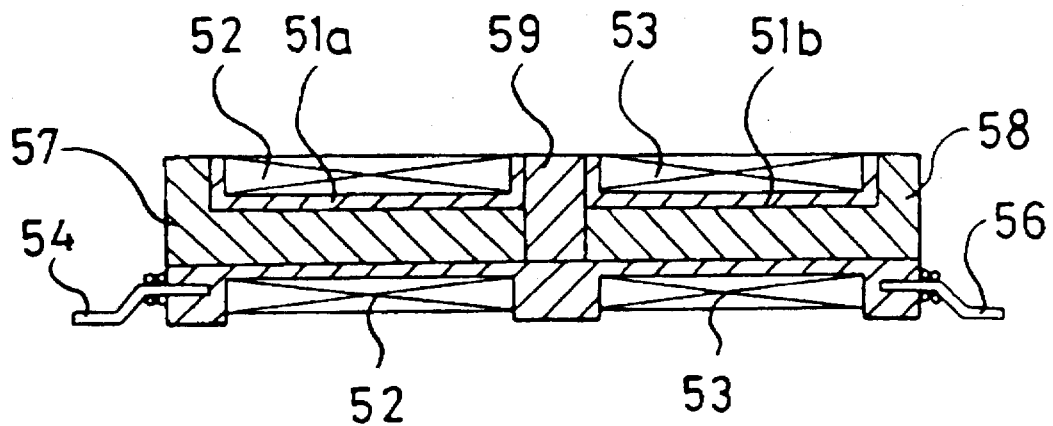
FIG. 6 is a sectional view of the boosting transformer.

FIGS. 5 and 6 exemplarily illustrate a construction of the boosting transformer 31.

This boosting transformer 31 includes a coil 52 comprising the input coil section $31P_1$ and the output coil section $31S_1$ both wound around a winding drum $51a$ of a bobbin 51 and a coil 53 comprising the input coil section $31P_2$ and the output coil section $31S_2$ both wound around a winding drum $51b$ of the bobbin 51.

Ends of the respective coils are fixed to respective terminal pins 54, 55, 56 planted on the bobbin by means of soldering or the like.

Ferrite cores 57, 58 are E-shaped cores of identical configuration and have their center legs inserted into the respective winding drums $51a$, $51b$. An I-shaped ferrite core 59 is received between middle flanges $51c$ so as to be in contact with the end surfaces of the legs of said cores 57, 58.

The boosting transformer 31 of such construction reduces the voltage generated across each of the output coil sections $31S_1$, $31S_2$ relative to the ground potential g to ½ of the total output voltage, thereby not only facilitating the dielectric treatment but also alleviating the leakage current. In this way, the boosting transformer 31 can be realized as a thin transformer having a thickness in the order of 5 mm.

Figure 7:
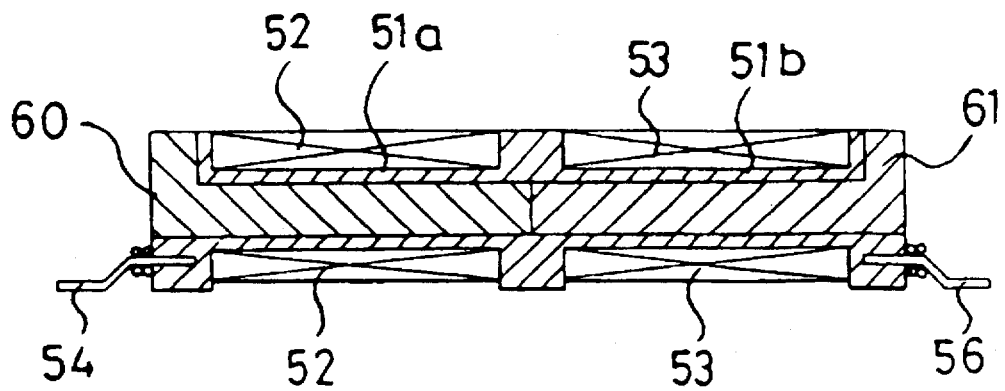
FIG. 7 is a sectional view of a boosting transformer having a pair of E-shaped cores.

Referring to FIG. 7, the boosting transformer 31 may be constructed by using, instead of the I-shaped ferrite core, a pair of E-shaped ferrite cores 60, 61 similar to those used by the previously described embodiment.

It should be understood that the boosting transformer 31 is not limited to the above-mentioned and illustrated constructions but may be realized as transformers having other various constructions.

Figure 8:
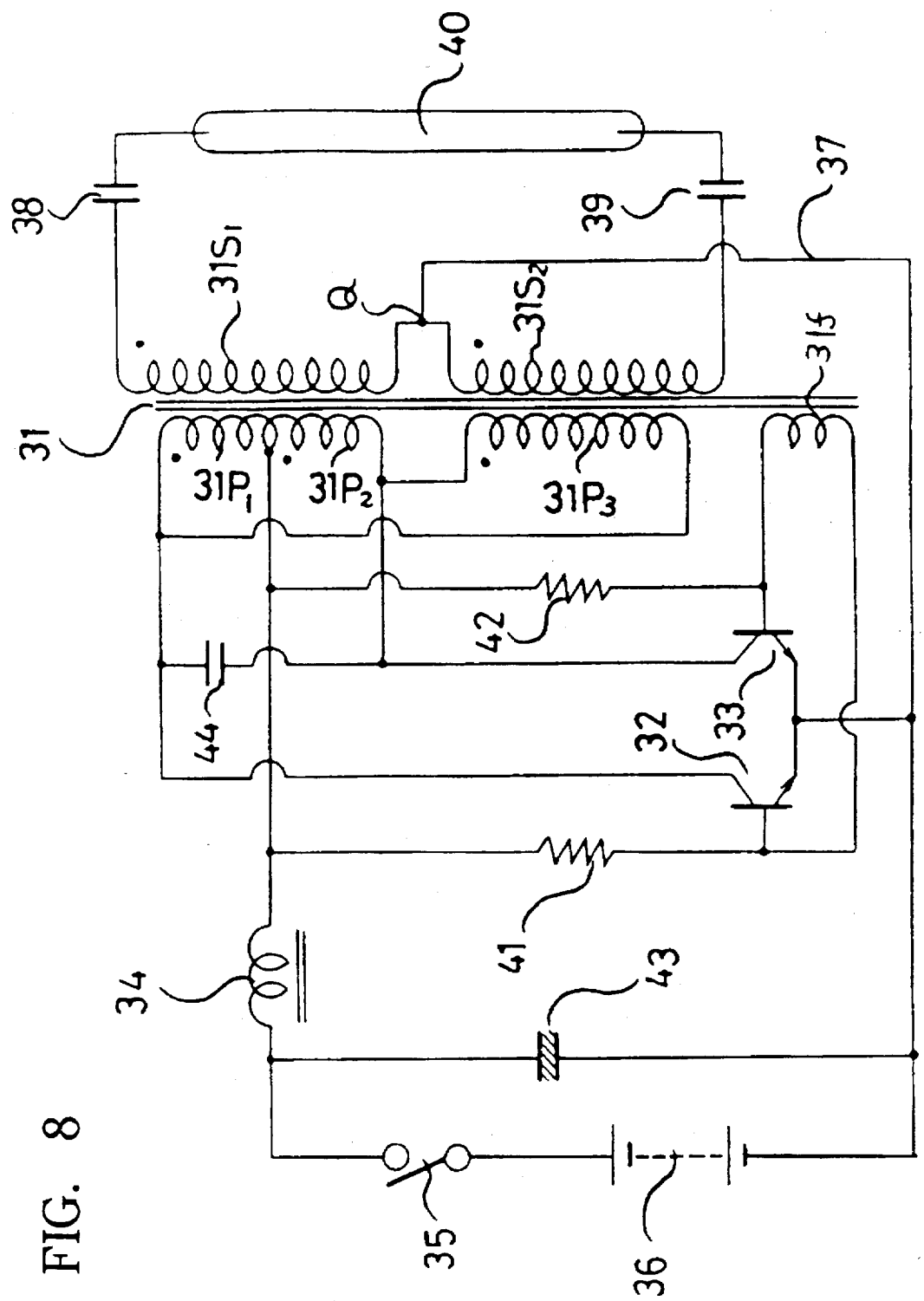
FIG. 8 is a circuit diagram similar to FIG. 1 but showing another embodiment of the invention.

FIG. 8 is a circuit diagram showing another embodiment of the inverter.

In this embodiment, there is additionally provided an input coil section $31P_3$ in parallel with the input coil sections $31P_1$, $31P_2$ of the boosting transformer 31 so that the input coil sections $31P_1$, $31P_2$ generate an inductive voltage across the output coil section $31S_2$ and the input coil section $31P_3$ generates an inductive voltage across the output coil section $31S_2$.

For this embodiment, the input coil sections $31P_1$, $31P_2$ and the output coil section $31S_1$ are wound around the winding drum 51a of the bobbin 51 while the input coil section $31P_3$ and the output coil section $31S_2$ are wound around the winding drum 51b to construct the boosting transformer 31 as shown in FIGS. 6 and 7.

In the respective embodiments of the inverter shown in FIGS. 1 and 8, any one of the starting resistors 41, 42 may be eliminated in order that a power loss due to these starting resistors 41, 42 be reduced to a degree as low as possible and thereby the efficiency be maximized.

Figure 9:
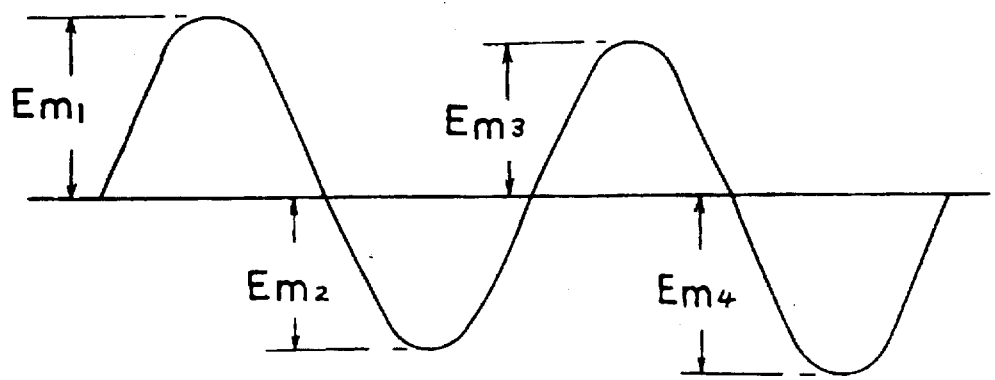
FIG. 9 is an output waveform diagram illustrating a manner in which an inverter of FIG. 10 operates.

However, use of a single starting resistor would result in an output voltage waveform presenting somewhat uneven peak values $Em_1$ to $Em_4$ as illustrated in FIG. 9.

Specifically, FIG. 9 illustrates a state of $Em_1$, $Em_4$>$Em_2$, $Em_3$.

The output voltage presenting such unbalanced waveform is undesirable when the inverter is used to drive the fluorescent lamp 40.

Figure 10:
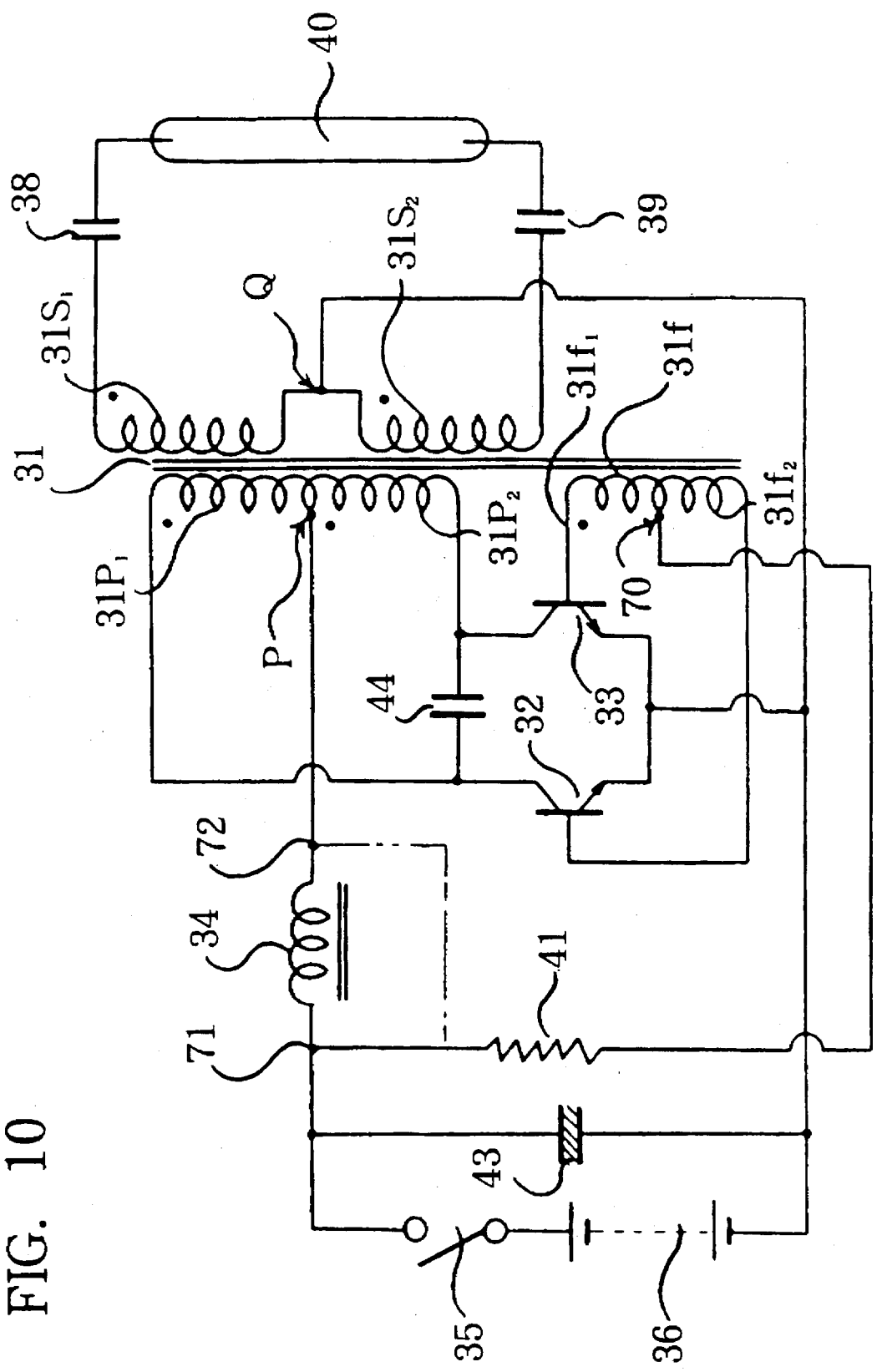
FIG. 10 is a circuit diagram similar to FIG. 1 but showing still another embodiment of the invention in which a feedback coil of the boosting transformer is provided with a center tap.
Figure 11:
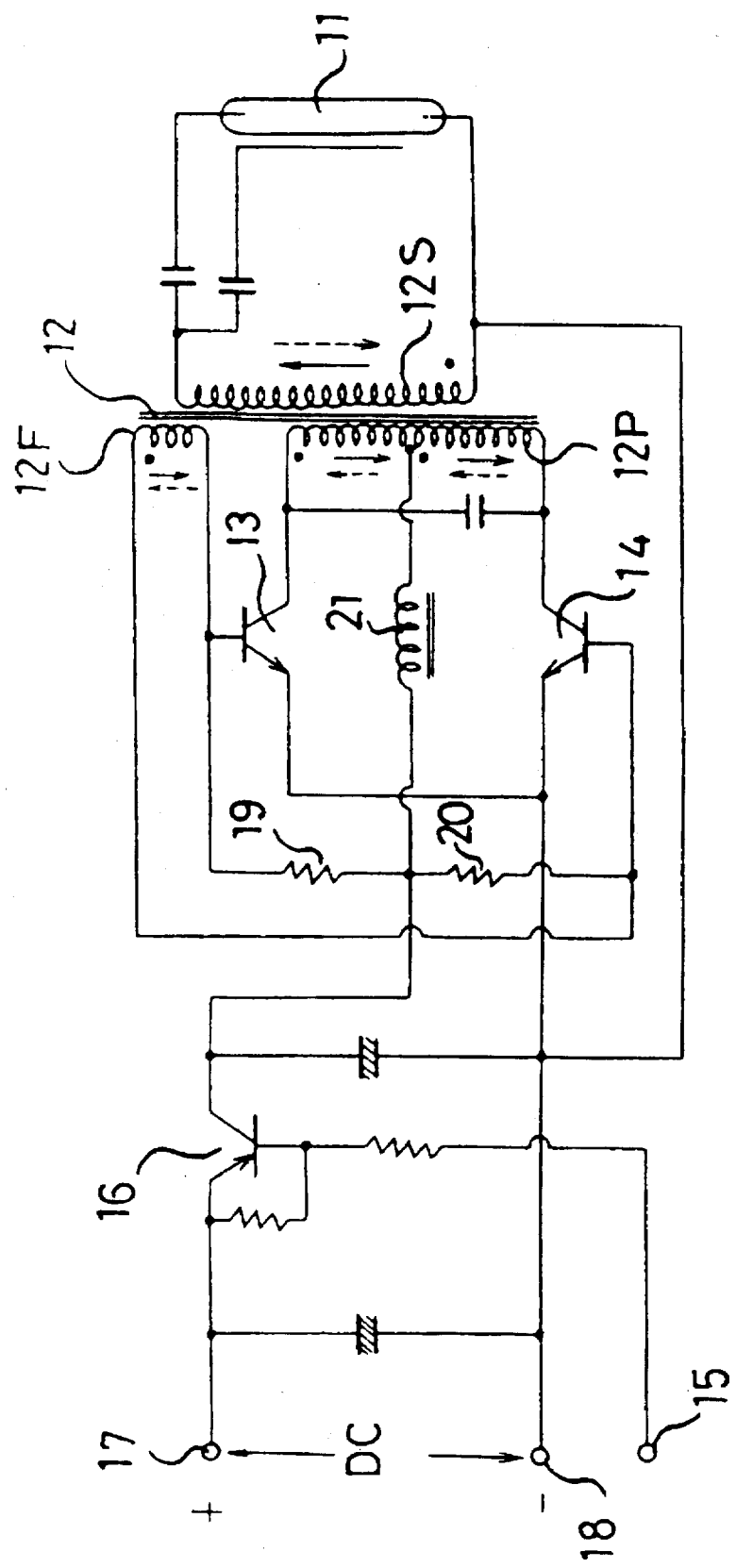
FIG. 11 is a circuit diagram of the conventional inverter.

FIG. 10 shows the inverter constructed so as to overcome such problem.

In this inverter, the feedback coil 31f is provided with a center tap 70 connected through a single starting resistor 41 to a circuit section 71 on the positive pole side of the source battery 36.

Such construction is effective to generate the output voltage waveform presenting even peak value, since the starting current flows through a feedback coil section $31f_1$ to the base of the transistor 32 and simultaneously flows through a feedback coil section $31f_2$ to the base of the transistor 33.

It should be understood that the center tap 70 is preferably provided at a position dividing the feedback coil 31f into the coil sections $31f_1$ and $31f_2$ of equal lengths.

It is also possible, as indicated by a chain line, to connect the starting resistor 41 to a circuit section 72 following the choke coil 34.

While the invention has been described with respect to preferred embodiments, the invention is not limited to drivers for fluorescent lamps but applicable also to push-pull inverters to drive electrical machinery and apparatus of other various types.

What is claimed is:

1. A self-exiciting push-pull inverter comprising: input means connectable to a DC source; a boosting transformer composed of an input coil having two input coil section connected at a center tap, the center tap being connected to said input means for receiving DC current from the DC source, an output coil for supplying power to a load and a feedback coil inductively coupled to said input coil so that an alternating voltage is generated across said feedback coil; and first and second switching elements each having a control electrode connected to said feedback coil to be alternatingly turned on and off in dependence on the direction of the voltage across said feedback coil, wherein current through one of the input coil sections is switched on and off by operation of said first switching element and current flow through the other one of said input coil sections is switched on and off by operation of said second switching element so that an alternating voltage is output from said output coil, said self-exciting push-pull inverter being characterized in that:

said output coil of said boosting transformer comprises two output coil sections and a conductor section connecting said two output coil sections together and circuit-arranged so that said conductor section is at a negative potential of the DC source;

said inverter further comprises at least one capacitor; and said output coil has two ends, each of which is an end of a respective output coil section, and the load is connectable between said two ends of said output coil, with said at least one capacitor in series between said output coil and the load, so that a voltage drop is created across said at least one capacitor and a voltage which is the difference between the sum of voltages generated in said two output coil sections and the voltage drop across said at least one capacitor is applied to the load, and a load current generated by the voltage applied to the load flows over a series path composed of said output coil, said at least one capacitor and the load, whereby said inverter has effective insulation and breakdown voltage characteristics.

2. A self-excitation type push-pull inverter according to claim 1, wherein the first and second switching elements comprise transistors.

3. A self-excitation type push-pull inverter according to claim 1, wherein the load connected between the ends of the coils of the two output coil sections is a fluorescent lamp having two electrodes; and said at least one capacitor comprises a first capacitor connected between one end of said output coil and one electrode of the fluorescent lamp, and a second capacitor connected between the other end of said output coil and the other electrode of the fluorescent lamp.

4. A self-excitation type push-pull inverter according to claim 1, wherein the conductor section connected between the two output coil sections is grounded.

5. A self-excitation type push-pull inverter according to claim 1, wherein a center tap is provided to the feedback coil of the boosting transformer so that a starting current supplied from the DC source is applied through one starting resistor and the center tap to the feedback coil which, in turn, applies the starting current to the respective control electrodes of the first and second switching elements.

* * * * *